United States Patent [19]

König et al.

[11] Patent Number: 5,179,143

[45] Date of Patent: Jan. 12, 1993

[54] PROCESS FOR THE PREPARATION OF COMPRESSION MOLDED MATERIALS

[75] Inventors: Eberhard König; Hanns I. Sachs, both of Cologne; Peter Kasperek, Much; Donald R. Larimer, Bergisch Gladbach, all of Fed. Rep. of Germany

[73] Assignee: Bayer Aktiengesellschaft, Bayerwerk, Fed. Rep. of Germany

[21] Appl. No.: 835,652

[22] Filed: Feb. 13, 1992

Related U.S. Application Data

[63] Continuation-in-part of Ser. No. 783,483, Oct. 28, 1991, abandoned, which is a continuation of Ser. No. 643,978, Jan. 22, 1991, abandoned, which is a continuation-in-part of Ser. No. 382,468, Jul. 19, 1989, abandoned.

[30] Foreign Application Priority Data

| | | | |
|---|---|---|---|
| Jul. 26, 1988 | [DE] | Fed. Rep. of Germany | 3825320 |
| Jun. 30, 1989 | [AU] | Australia | 37290/89 |
| Jul. 11, 1989 | [NO] | Norway | 892864 |
| Jul. 13, 1989 | [EP] | European Pat. Off. | 89112837.3 |
| Jul. 18, 1989 | [CA] | Canada | 606024 |
| Jul. 24, 1989 | [FI] | Finland | 893543 |
| Jul. 24, 1989 | [JP] | Japan | 1-189020 |
| Jul. 24, 1989 | [NZ] | New Zealand | 230054 |
| Jul. 25, 1989 | [BR] | Brazil | PI8903675 |
| Jul. 25, 1989 | [DK] | Denmark | 3664/89 |
| Jul. 25, 1989 | [ZA] | South Africa | 895641 |

[51] Int. Cl.$^5$ .................. C08L 1/00; C08K 5/13
[52] U.S. Cl. .......................... 524/35; 524/72; 528/73; 528/85
[58] Field of Search .......... 528/73, 85; 524/35, 524/72

[56] References Cited

U.S. PATENT DOCUMENTS

| | | | |
|---|---|---|---|
| 3,882,071 | 5/1975 | Olstowski et al. | 528/85 |
| 3,882,072 | 5/1975 | Olstowski et al. | 528/73 |
| 3,883,466 | 5/1975 | Olstowski | 528/73 |
| 3,883,484 | 5/1975 | Olstowski | 528/85 |
| 3,892,705 | 7/1975 | Olstowski | 528/73 |
| 4,075,151 | 2/1978 | Olstowski | 528/85 |
| 4,359,507 | 11/1982 | Gaul et al. | 428/425 |
| 4,414,361 | 11/1983 | Gaul et al. | 524/702 |
| 4,486,557 | 12/1984 | Gaul et al. | 528/23 |
| 4,731,427 | 3/1988 | Younes | 528/53 |
| 4,801,644 | 1/1989 | Coogan | 528/67 |

FOREIGN PATENT DOCUMENTS

| | | |
|---|---|---|
| 793937 | 9/1968 | Canada . |
| 1492507 | 3/1969 | Fed. Rep. of Germany . |
| 2403656 | 10/1975 | Fed. Rep. of Germany . |
| 2538999 | 3/1977 | Fed. Rep. of Germany . |
| 1148016 | 4/1969 | United Kingdom . |
| 1387454 | 3/1975 | United Kingdom . |

OTHER PUBLICATIONS

Journal of Elastomers and Plastics, vol. 16: Jul., 1984–pp. 206–228.

*Primary Examiner*—Morton Foelak
*Attorney, Agent, or Firm*—Joseph C. Gil; N. Denise Brown

[57] ABSTRACT

This invention relates to a process for the preparation of compression molded materials comprising compressing a substrate with a binder based on polyisocyanates, wherein said binder comprises polyisocyanates, compounds containing at least two isocyanate reactive hydrogen atoms, and alkylene carbonates.

6 Claims, No Drawings

PROCESS FOR THE PREPARATION OF COMPRESSION MOLDED MATERIALS

CROSS-REFERENCE TO RELATED APPLICATION

This application is a continuation-in-part of application Ser. No. 07/783,483, filed on Oct. 28, 1991, now abandoned, which in turn is a continuation of application Ser. No. 07/643,978, filed Jan. 22, 1991, now abandoned, which in turn is a continuation-in-part of U.S. application Ser. No. 07/382,468, filed on July 19, 1989 now abandoned.

BACKGROUND OF THE INVENTION

This invention relates to a process for the production of compression molded materials using polyisocyanate binders or mixtures of polyisocyanates and other binders together with isocyanate reactive materials and alkylene carbonates.

Compression molded materials, such as chipboard, composite board, or other such molded products, are conventionally produced by hot pressing inorganic or organic raw materials, such as a mass of wood shavings, wood fibers, or other material containing lignocellulose, with various glues or binders. The woodworking industry, which is the largest manufacturer of compression molded materials, still uses what has generally been regarded as the most important binders, including, for example, aqueous dispersions or solutions of urea-formaldehyde ("aminoplast") or phenol-formaldehyde ("phenoplast") resins.

The use of polyisocyanates or polyisocyanate solutions instead of formaldehyde-based resins as binders for pressboard is also known. (see, e.g., German Offenlegungsschriften 1,271,984, 1,492,507, 1,653,177, and 2,109,686.) Polyisocyanates, which have been increasingly used industrially as binders since 1973, improve the stability and moisture resistance and increase the mechanical strength of the products. In addition, polyisocyanate binders have extensive process technology advantages, as disclosed in German Offenlegungsschrift 2,109,686.

The large scale industrial production of materials bonded with polyisocyanates, especially materials containing lignocellulose such as wood chipboard, has, however, been hindered at least in part because, in contrast to materials which are bonded with aminoplast resins, chips bonded with polyisocyanates have no intrinsic tackiness (i.e., no capacity for adhesiveness) at room temperature. Even preliminary compression at room temperature ("cold pressing") of materials bonded with polyisocyanates, but which are still moist, will not yield preforms that are sufficiently stable and self-supporting for the purposes of many production plants. As a result, the universal application of polyisocyanates for the production of compression molded materials is made very difficult.

The molded chips or shavings that are spread over belts, press plates, and the like are transferred to other belts, plates, rolls, or the like on their way to the hot press. These preforms are then discharged from them or the supports are pulled out from under them. In order to enable this process to be carried out without destroying the preforms of chips and without damaging their outer zones, the preforms are subjected to a cold precompression. This precompression is also intended to bond the surface chips together so that as the hot press plates are brought together the air escaping between the preforms and the plates will not carry away any chips (i.e., so that no cavities will form on the surfaces due to the escape of air). Prepresses operating continuously and in cycles are available to subject the chips to specific pressures of up to 40 bar for from 10 to 60 seconds.

One object of the present invention is development of a process which eliminates the disadvantage of the lack of cold tack of chips blended with polyisocyanate binders while at the same time not sacrificing the easy pourability of the bonded chips, a characteristic necessary for spreading chips easily into the required shapes of the preforms. The process according to the invention solves this problem in a manner which is surprisingly simple for one skilled in the art.

DETAILED DESCRIPTION OF THE INVENTION

The invention broadly comprises a process for the preparation of compression molded materials comprising:

i) mixing a lignocellulose-containing material with a polyisocyanate based binder, wherein said binder comprises:

a) an aromatic polyisocyanate selected from the group consisting of toluene diisocyanate, polyphenyl polymethylene polyisocyanates, and modified aromatic polyisocyanates, b) polyester or polyether containing at least two hydroxyl groups and having a molecular weight of from about 400 to about 10,000, and c) an alkylene carbonate, wherein the total amount of components b) plus c) is from about 10 to about 250 parts by weight per 100 parts by weight of component a), and wherein the weight ratio of component b) to component c) is from about 0.5:1.0 to about 10.0:1.0, ii) compressing the resultant mixture without the application of heat to form a preform, and iii) molding said preform under heat and pressure.

In the preferred embodiments according to the invention, the various constituents can have the following compositions and properties:

(i) the binder contains from about 20 to about 80 parts by weight), based on 100 parts by weight of polyisocyanate, of components b) and c);

(ii) the alkylene carbonate can be propylene carbonate;

(iii) the aromatic polyisocyanates can be mixtures of diphenylmethane diisocyanates and polyphenylpolymethylene polyisocyanates obtainable by aniline-formaldehyde condensation followed by phosgenation; and (iv) the binder can additionally contain aqueous condensation products of urea, melamine, phenol, and tannin or any mixtures thereof with formaldehyde and/or sulfite waste liquors.

Cold tack of chips blended with the above binders, for example, chips of raw materials containing lignocellulose, is achieved using the process of this invention. The advantages afforded by the polyisocyanates as binders for compression molded materials may, therefore, also be applied to production lines in which cold tack of the chips is essential for the preforms. The possibility of reducing the time required for compression in the hot press is of particular economical advantage. The capacity for cold tack of chips blended with the binders according to the invention provides further advantages.

Damage in the surface zones of preforms of scattered chips is reduced or prevented; the reduction in losses due to damage at the edges enhances economical utilization of the unfinished boards. The advantages of the process of this invention also makes the process attractive for installations in which cold tack of the chip preforms is not absolutely essential.

The combination of polyols with polyisocyanates as binders (German Offenlegungsschriften 2,538,999 and 2,403,656) and the addition of alkylene carbonates (e.g., propylene carbonate) to polyisocyanate (U.S. Pat. No. 4,359,507; J. Elast. Plast., 16, 206–228 (1984)) have been fully described. Such binders, however, cannot be economically used unless the liquids are applied to the chips as a very fine spray. For highly viscous polyols, application is achieved by using a colloidal solution of the polyol component in a liquid medium, such as water (German Offenlegungsschrift 2,538,999). Alkylene carbonates (e.g., propylene carbonate), because of their low viscosity, may be used as such or together with the polyisocyanate. The behavior of blended chips using these known methods, however, does not differ from the behavior of chips blended only with pure polyisocyanate binders. Moreover, the addition of compounds containing hydroxyl groups leads to the rapid formation of the corresponding polyurethanes. Thus, satisfactory use of these methods under the conditions customarily used in the woodworking industry (i.e., storage of the blended raw material for up to 60 minutes, in part at elevated temperatures) would not be expected.

It must, therefore, be considered all the more surprising to one skilled in the art to find that the addition of polyols and alkylene carbonate to polyisocyanate binders (or mixtures of polyisocyanates with other binders) in quantities of from about 10 to about 250 parts by weight (preferably 20 to 80 parts by weight), based on 100 parts by weight of polyisocyanate, results in cold tack of such blended raw materials with retention of good pourability.

The weight ratio of polyol to alkylene carbonate ranges from about 0.5:1.0 to about 10.0:1.0 parts by weight (preferably from 1.0:1.0 to 3.0:1.0 parts by weight). In contrast to raw materials which have been blended using polyisocyanates alone, the blended raw materials according to the invention retain their cold tack in storage. Furthermore, the addition of the polyols and alkylene carbonates according to the invention allows a reduction, often a considerable reduction, of time needed for compressing the materials in the hot press, depending on the temperature of the press, without loss of the physical and mechanical properties of the boards obtained as end products.

Suitable alkylene carbonates include liquid cyclic alkylene carbonates (i.e., cyclic alkylene esters of carboxylic acids), preferably propylene carbonate and butylene carbonate.

Suitable polyisocyanates used according to the invention are aromatic polyisocyanates selected from the group consisting of toluene diisocyanate, polyphenyl polymethylene polyisocyanates, and modified aromatic polyisocyanates. As used herein, the term "toluene diisocyanate" means 2,4- and 2,6-toluene diisocyanate and mixtures thereof. As used herein, the term "polyphenyl polymethylene polyisocyanate" means diphenylmethane diisocyanates (i.e., the 4,4'-isomer, the 2,4'-isomer, the 2,2'-isomer, and mixtures thereof), polyphenyl polymethylene polyisocyanates obtainable by aniline-formaldehyde condensation followed by phosgenation, and mixtures thereof. As used herein, the term "modified aromatic polyisocyanate" means aromatic polyisocyanates containing carbodiimide groups, urethane groups, allophanate groups, isocyanurate groups, urea groups, or biuret groups.

All the isocyanates useful herein are known in the art. The polyphenyl polymethylene polyisocyanates are described, for example, in British patents 874,430 and 848,671. Polyisocyanates containing carbodiimide groups are described in German patent 1,092,007 (U.S. Pat. No. 3,152,162) and in German Offenlegungsschriften 2,504,400, 2,537,685, and 2,552,350. Polyisocyanates containing allophanate groups are described, for example, in British patent 994,890, Belgian patent 761,626, and Netherlands patent application 7,102,524. Polyisocyanates containing isocyanurate groups are described, for example, in U.S. Pat. No. 3,001,973, German Patents 1,022,789, 1,222,067, and 1,027,394, and in German Offenlegungsschriften 1,929,034 and 2,004,048. Polyisocyanates containing urethane groups are described, for example, in Belgian patent 752,261 or U.S. Pat. Nos. 3,394,164 and 3,644,457. Polyisocyanates containing acylated urea groups are described in German Patent 1,230,778. Polyisocyanates containing biuret groups are described, for example, in U.S. Pat. Nos. 3,124,605, 3,201,372, and 3,124,605 and British patent 889,050. Preferred modified aromatic polyisocyanates are those based on 2,4- and/or 2,6-toluene diisocyanates or on 4,4'- and/or 2,4'-diphenylmethane diisocyanate.

The polyester or polyether compounds containing at least two hydroxyl groups and having molecular weight of from 400 to 10,000 are preferably compounds containing from 2 to 8 hydroxyl groups, and especially those with molecular weights of from about 1000 to about 8000 (preferably from 1500 to 4000). The preferred polyester and polyether compounds are those containing at least 2 (generally from 2 to 8 and preferably from 2 to 4) hydroxyl groups, such as those known in the art for the production of both homogeneous and cellular polyurethanes.

Suitable hydroxyl-containing polyesters include, for example, reaction products of polyhydric (preferably dihydric) alcohols, optionally together with trihydric alcohols, and polybasic (preferably dibasic) carboxylic acids. Instead of the free polycarboxylic acids, corresponding polycarboxylic acid anhydrides or corresponding polycarboxylic acid esters of lower alcohols or mixtures thereof may be used for the preparation of the polyesters used according to the invention. Suitable polycarboxylic acids include aliphatic, cycloaliphatic, aromatic, and heterocyclic polycarboxylic acids and may be substituted, for example, with halogen atoms, and/or may be unsaturated.

Examples of carboxylic acids and derivatives thereof that are suitable for preparation of hydroxyl-containing polyesters include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetra-chlorophthalic acid anhydride, endomethylene tetrahydrophthalic acid anhydride, glutaric acid anhydride, maleic acid, maleic acid anhydride, fumaric acid, dimerized and trimerized unsaturated fatty acids optionally mixed with monomeric unsaturated fatty acids such as oleic acid, dimethyl-terephthalate, and terephthalic acid bisglycol ester.

Examples of polyhydric alcohols that are suitable for preparation of hydroxyl-containing polyesters include ethylene glycol, 1,2- and 1,3-propanediol, 1,4- and 2,3-butanediol, 1,6-hexanediol, 1,8-octanediol, neopentyl glycol, 1,4-bis(hydroxymethyl)cyclohexane, 2-methyl-1,3-propanediol, glycerol, trimethylol propane, 1,2,6-hexanetriol, 1,2,4-butanetriol, trimethylol ethane, pentaerythritol, quinitol, mannitol and sorbitol, formitol, 1,4:3,6-dianhydrosorbitol, methyl glycoside, diethylene glycol, triethylene glycol, tetraethylene glycol and higher polyethylene glycols, dipropylene glycol and higher polypropylene glycols, and dibutylene glycol and higher polybutylene glycols. The polyesters may contain a proportion of carboxyl end groups. Polyesters of lactones, such as ε-caprolactone, or of hydroxycarboxylic acids, such as hydroxycaproic acid, may also be used.

Suitable polyethers containing at least 2 (generally 2 to 8 and preferably 2 or 3) hydroxyl groups include known types that may be prepared, for example, by the polymerization of epoxides, such as ethylene oxide, propylene oxide, butylene oxide, styrene oxide, or epichlorohydrin, or polymerization of tetrahydrofuran. Such polymerizations may be carried out using only the monomers, for example, in the presence of Lewis-catalysts such as $BF_3$. The polymerization may also be carried out by chemical addition of the epoxides (preferably ethylene oxide and propylene oxide, optionally as mixtures or successively) to starting components containing reactive hydrogen atoms, such as water, alcohols, ammonia or amines, including, for example, ethylene glycol, 1,3- or 1,2-propanediol, trimethylol propane, glycerol, sorbitol, 4,4'-di-hydroxydiphenylpropane, aniline, ethanolamine, or ethylene diamine. It is often preferred to use polyethers in which the OH groups are predominantly (up to about 90% by weight thereof, based on all the OH groups present in the polyether) primary OH groups.

Also suitable are sucrose polyesters (for example, DE-B 1,176,358 and 1,064,938), and polyethers started on formitol or formose (DE-A 2,639,083). Polybutadienes containing OH groups are also suitable. Mixtures of polyesters and polyethers may, of course, also be used.

Compounds in the molecular weight range of from 32 to 399 containing at least two isocyanate reactive hydrogen atoms may also be used as a component in the process of the invention. Suitable such compounds are compounds containing hydroxyl groups, amino groups, thiol groups, carboxyl groups, or a combination thereof (preferably hydroxyl groups and/or amino groups), and are used as chain extenders or crosslinking agents. Such compounds generally contain from about 2 to about 8 (preferably 2 to 4) isocyanate reactive hydrogen atoms. These compounds may also be used as mixtures of different such compounds in the molecular weight range of from 32 to 399 containing at least two isocyanate reactive hydrogen atoms. Examples of such compounds are fully described, for example, in German Offenlegungsschrift 3,430,285, on pages 19 to 23.

Optional components in the process of the invention include auxiliary agents, for example, known catalysts and surface active additives such as emulsifiers and stabilizers.

Suitable catalysts include tertiary amines such as triethylamine, tributylamine, N-methylmorpholine, N-ethyl-morpholine, N,N,N',N'-tetramethylethylene diamine, penta-methyldiethylene triamine, and higher homologues (German Offenlegungsschriften 2,624,527 and 2,624,528), 1,4-diaza-bicyclo[2.2.2]octane, N-methyl-N'-(dimethylaminoethyl)piperazine, bis(dimethylaminoalkyl)piperazines (German Offenlegungsschrift 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift 1,720,633), bis(dialkylamino)alkyl ethers (U.S. Pat. No. 3,330,782, German Auslegeschrift 030,558, and German Offenlegungsschriften 1,804,361 and 2,618,210), and tertiary amines containing amide groups (preferably formamide groups) according to German Offenlegungsschrift 2,523,633 and 2,732,292. The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate reactive hydrogen atoms. Examples of such catalysts include triethanolamine, triisopropanolamine, N-methyldiethanolamine, N-ethyl-diethanolamine, N,N-dimethylethanolamine, their reaction products with alkylene oxides (such as propylene oxide and/or ethylene oxide) and secondary-tertiary amines according to German Offenlegungsschrift 2,732,292.

Silaamines containing carbon-silicon bonds may also be used as catalysts, for example, those described in German Patentschrift 1,229,290 (corresponding to U.S. Pat. No. 3,620,984). Examples of suitable silaamines include 2,2,4-trimethyl-2-silamorpholine and 1,3-dimethylaminomethyl tetramethyldisiloxane.

Suitable catalysts also include nitrogen-containing bases, such as tetraalkylammonium hydroxides; alkali metal hydroxides, such as sodium hydroxide; alkali metal phenolates, such as sodium phenolate; and alkali metal alcoholates, such as sodium methoxide. Hexahydrotriazines (German Offenlegungsschrift 1,709,043) and tertiary amines containing amide groups (preferably formamide groups) (German Offenlegungsschriften 2,523,633 and 2,732,292) may also be used as catalysts. Known Mannich bases of secondary amines (such as dimethylamine) and aldehydes (preferably formaldehyde) or ketones (such as acetone) and phenols may also be used as catalysts.

Other suitable catalysts include organic metal compounds, especially organic tin compounds. Suitable organic tin compounds include those containing sulfur, such as di-n-octyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin (IV) compounds, such as dibutyl tin dilaurate.

Any of the above-mentioned catalysts may, of course, be used as mixtures.

Further representatives of catalysts to be used according to the invention and details concerning their mode of action are described in Kunststoff Handbuch, Volume VII, published by Vieweg and Höchtlen, Carl Hanser Verlag, Munich 1966, e.g., on pages 96 to 102.

The catalysts are generally used in a quantity ranging from about 0.001 to about 10% by weight, based on the quantity of polyisocyanate.

Suitable surface active additives include emulsifiers and foam stabilizers. Suitable emulsifiers include, for example, the sodium salts of ricinoleic sulfonates and salts of fatty acids with amines, for example, oleic acid diethylamine or stearic acid diethanolamine. Other suitable surface active additives include alkali metal or ammonium salts of sulfonic acids (such as dodecylbenzenesulfonic acid or dinaphthyl-methanedisulfonic acid), of fatty acids (such as ricinoleic acid), or of polymeric fatty acids.

Suitable substrates used in the process of the invention include lignocellulose-containing raw materials that can be bonded with the binders according to the invention. Examples of suitable lignocellulose-containing materials include wood, woodbark, cork, bagasse straw, flax, bamboo, esparto, rice husks, and sisal and coconut fibers. Other suitable substrates for compression molding include other organic raw materials (for example, all kinds of plastic waste) and inorganic raw materials (for example, expanded mica or silicate balls). The substrate may be used in the form of granulates, shavings or chips, fibers, spheres, or powder and may have a moisture content of, for example, from about 0 to about 35% by weight (preferably from 4 to 20% by weight).

It is possible, but less preferred, to apply the components of the binder combination (polyisocyanate, polyether polyol or polyester polyol, and alkylene carbonate) separately to the material which is to be bonded. It is preferable to use the polyether or polyester polyol and the alkylene carbonate as a mixture with the polyisocyanate as binder.

In the process of the invention, the binder is added to the organic and/or inorganic material to be bonded in a quantity of about 0.5 to about 20% by weight (preferably 2 to 12% by weight), based on the total weight of the end product. The resultant material is compressed to form boards or three dimensionally shaped molded products, generally under heat and pressure (for example, about 70° to about 250° C. and about 1 to about 150 bar).

Multilayered boards or molded parts may be produced in analogous manner from veneers, paper, or woven fabrics by treating the layers with the binder as described above and subsequently pressing them, generally at elevated temperature and elevated pressure. Temperatures of from about 100 to about 250° C. are preferred, with 130° to 200° C. being most preferred. The initial compression pressure is preferably in the range of from about 5 to about 150 bar, although the pressure in most cases drops towards 0 bar during the compression process.

The binders used according to the invention may also be used in combination with aqueous solutions of condensation products of formaldehyde and urea and/or melamine and/or phenol, which are the binders most commonly used in the woodworking industry. In addition, the binders may be combined with less commonly used binders and impregnating agents, for example, those based on polyvinyl acetate or other synthetic resin lattices, sulfide waste liquors, or tannin. When using a mixture of the binders according to the invention with these additional binders, the proportions used are from about 1:20 to about 20:1 (preferably from 1:5 to 5:1). The polyisocyanate mixtures and the additional binders may be used separately or as a mixture.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

The following polyols are used as starting components in the Examples:

Polyether Polyol I prepared from 1,2-propanediol and propylene oxide and having an OH number of 284 and a viscosity of 75 mPa.s at 25° C.

Polyether Polyol II prepared from 1,2-propanediol, propylene oxide, and ethylene oxide and having an OH number of 185 and a viscosity of 130 mPa.s at 25° C.

Polyether Polyol III prepared from ethylene diamine and propylene oxide and having an OH number of 60 and a viscosity of 660 mPa.s at 25° C.

EXAMPLE 1

Face layer industrial chips (moisture content $u = 15.0\%$ by weight oven-dried ("o.d.") wood) (2800 g) and core layer chips ($u = 10.0\%$ o.d.) (6400 g) were each sprayed with 5% by weight o.d. of a binder consisting of a mixture of 70% by weight crude diphenylmethane-4,4'diisocyanate having an isocyanate content of 30% by weight, 10% by weight polyether polyol I, 10% by weight polyether polyol II, and 10% by weight of propylene carbonate. This material was spread out to form three-layered board preforms and at selected time intervals was compressed both cold and hot under pressure.

EXAMPLE 2

Boards were prepared as in Example 1 except that the binder was composed of a mixture of 70% by weight crude diphenylmethane-4,4'diisocyanate having an isocyanate content of 30% by weight, 20% by weight polyether polyol III, and 10% by weight propylene carbonate. The isocyanate and the polyol/ alkylene carbonate mixture were sprayed separately on the chips. Compression molding was performed as in Example 1.

EXAMPLE 3

Face layer industrial chips ($u = 12.0\%$ o.d.) (4200 g) were sprayed with 13% by weight o.d. of a binder consisting of a mixture of 80% by weight crude diphenylmethane-4,4'-diisocyanate having an isocyanate content of 30% by weight, 12% by weight polyether polyol II, and 8% by weight propylene carbonate. The chips were spread out to form single-layered board preforms and compression molded as in Example 1.

EXAMPLE 4

Boards were prepared as in Example 3 except that one half of the binder was a mixture of 70% by weight crude diphenylmethane-4,4'-diisocyanate having an isocyanate content 30% by weight, 20% by weight polyether polyol I, and 10% by weight polypropylene carbonate and the second half of the binder was a commercial E1 urea-formaldehyde resin. Three percent by weight o.d. of each half portion of binder was sprayed on the chips. Compression molding was performed as in Example 1.

All board preforms which were prepressed at room temperature according to Examples 1 to 4 exhibited cold tack, in contrast to chips which have been treated with polyisocyanate alone. Under hot pressing conditions, samples prepared according to the invention also have advantages over the comparison samples under identical experimental conditions. Test results are shown in the following Table.

TABLE

| Example | Gross Density of Boards (kg/m³) | Transverse Tensile* Strength (mPa) | |
| --- | --- | --- | --- |
| | | V20 | V100 |
| Comparison experiment using 5% by weight o.d. Desmodur PU 1520 A | 680 | 0.94 | 0.27 |
| 1 | 680 | 1.13 | 0.33 |
| 2 | 680 | 1.09 | 0.34 |
| 3 | 850 | | 0.82 |
| 4 | 650 | 0.84 | | o.d. = calculated percent by weight based on absolutely dry, oven dried wood
*Transverse tensile strength V20 and V100 tested according to German Standard DIN 68763 (flat pressed particle boards for building)

EXAMPLE 5

The following binders were used in Example 5.

Binder I: a prepolymer comprising 70 parts by weight of crude diphenylmethane-4,4'-diisocyanate having an isocyanate content of 30% by weight and a viscosity of 300 mPa.s at 25° C., and a mixture of 10 parts by weight of polyether polyol I and 10 parts by weight of polyether polyol II. Viscosity of about 52,000 mPa.s/25° C.

Binder II: the prepolymer of binder I containing 10 parts by weight of propylene carbonate. Viscosity of about 9300 mPa.s/ 25° C.

Binder III: an in-situ mixture of 70 parts by weight of crude diphenylmethane-4,4'-diisocyanate having an isocyanate content of 30% by weight and a viscosity of 300 mPa.s at 25° C., 10 parts by weight of polyether polyol I, 10 parts by weight of polyether polyol II, and 10 parts by weight of propylene carbonate (corresponds to binder used in Example 1, and illustrative of the invention).

A batch of face layer industrial chips (moisture content u=14.0% by weight oven dried wood) (3950 g) was sprayed with binder II or binder III in amounts of 10.4% by weight o.d. (quantity of binder based on prepolymer of diphenylmethane-4,4'-diisocyanate/polyol). The chips were spread out to form single-layer board preforms and were compressed at specific intervals in the cold state, after which the cold tack was determined.

Binder I, the prepolymer, was not usable due to its high viscosity (about 52,000 mPa.s/25° C. after 14 days).

Binder II, the prepolymer diluted with 10 parts by weight of propylene carbonate, has a viscosity of about 9300 mPa.s/25° C., which is still too high. Binder II can only be applied with great difficulty using high pressure spraying and is therefore not practical for industrial use. Upon exposure to atmospheric moisture, Binder II very quickly forms a skin on its surface and it has a tendency to foam.

Binder II and Binder III display almost the same degree of cold tack when the chips are blended therewith and compressed in the cold state.

Binder III has the advantages of being easy to handle and use, and economical to produce as the production costs associated with prepolymerization are dispensed with. The customer needs only to use one type of diphenyl-4,4'-diisocyanate, to which polyether polyol and propylene carbonate can if necessary be added in the required quantities, depending on the type of applications involved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of compression molded materials comprising:
   i) mixing a lignocellulose-containing material with a polyisocyanate based binder, wherein said binder comprises:
      a) an aromatic polyisocyanate selected from the group consisting of toluene diisocyanate, polyphenyl polymethylene polyisocyanates, and modified aromatic polyisocyanates,
      b) a polyester or polyether containing at least two hydroxyl groups and having a molecular weight of from about 400 to about 10,000, and
      c) an alkylene carbonate, wherein the total amount of components b) plus c) is from about 10 to about 250 parts by weight per 100 parts by weight of component a), and wherein the weight ratio of component b) to component c) is from about 0.5:1.0 to about 10.0:1.0,
   ii) compressing the resultant mixture without the application of heat to form a preform, and
   iii) molding said preform under heat and pressure.

2. The process of claim 1 wherein component b) plus component c) comprises from about 20 to about 80 parts by weight.

3. The process of claim 1 wherein the aromatic polyisocyanate is a polyphenyl-polymethylene polyisocyanates obtainable by aniline-formaldehyde condensation followed by phosgenation.

4. The process of claim 1, wherein said aromatic polyisocyanate is toluene diisocyanate.

5. The process of claim 1 wherein
   i) component a) is a polyisocyanate from the group selected from diphenylmethane diisocyanates, polyphenyl-polymethylene polyisocyanates obtainable by aniline-formaldehyde condensation followed by phosgenation and mixtures thereof,
   ii) component b) is a polyether or polyester having a molecular weight range of from about 400 to about 10,000 and containing hydroxyl groups,
   iii) component c) is propylene carbonate, and
   iv) component b) plus component c) totals from 20 to 80 parts per 100 parts of component a).

6. The process of claim 1 wherein particulates of waste plastics are added to the lignocellulose-containing material before mixing with said polyisocyanate based binder.

* * * * *